UNITED STATES PATENT OFFICE 2,606,192

BASICALLY SUBSTITUTED ETHERS OF PYRIDYL CARBINOLS

Robert S. Shelton, Mariemont, and Charles H. Tilford, Cincinnati, Ohio, assignors to The Wm. S. Merrell Company, Cincinnati, Ohio, a corporation of Delaware No Drawing. Application June 6, 1951, Serial No. 230,263

6 Claims. (Cl. 260—296)

This invention relates to basically substituted ethers of pyridyl carbinols which possess utility as sedatives.

These ethers are those comprehended by the generic formula:

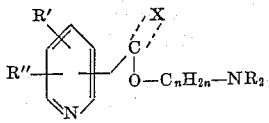

in which R' is a hydrogen atom or an alkyl radical having one or two carbon atoms, R" likewise is a hydrogen atom or an alkyl radical having one or two carbon atoms, $n$ is an integer from 1 to 3, —NR$_2$ is a dimethylamino, diethylamino, methylethylamino, 4-morpholino, 1-piperidino, or 1-pyrrolidino group and

is a saturated monocyclic or bicyclic carbon ring system having from 6 to 10 carbon atoms attached to the 2- or the 4-position of the pyridine nucleus.

These compounds can be prepared by methods described in our copending application, Serial No. 31,827, filed June 8, 1948, of which application this application is a continuation-in-part. According to these methods, an appropriate pyridyl carbinol in the form of its sodium salt is allowed to react with the desired basic alkyl chloride. The pyridyl carbinol can conveniently be obtained by reacting a suitable carbocyclic ketone with pyridine or a suitable pyridine derivative in the presence of a condensing agent, such as metallic aluminum or magnesium and a small amount of mercuric chloride. Ketones which are of particular interest as starting materials are camphor, fenchone, menthone, thujone and cyclohexanone. Pyridine derivatives which are of particular value are alpha-, beta- and gamma-picoline, alpha- and gamma-ethylpyridine, 2,3-, 2,4- and 2,6-dimethylpyridine and 2-ethyl-5-methylpyridine.

These ethers are generally isolated as light colored or colorless viscous oils which may crystallize on standing. They are readily converted to water soluble salts of acids such as hydrochloric, sulfuric, maleic, fumaric, succinic acids. The latter salts of dibasic organic acids are particularly easy to crystallize and purify and lend themselves readily to the preparation of syrups, elixirs, or tablets for therapeutic use.

The compounds will ordinarily be administered orally but parenteral administration is also possible.

The pharmacological action of these compounds is exemplified by the fumarate salt of 2 - (2 - γ - picolyl) - 2 - (β - diethylaminoethoxy) - camphane which has an oral LD$_{50}$ in mice of 340 mg./kg. and an intravenous LD$_{50}$ in mice of 62 mg./kg. When a 10 mg./kg. subcutaneous dose of this compound is administered to mice under mild narcosis with Evipal (5-cyclohexenyl-1,5-dimethyl barbituric acid) the effect of the barbiturate is potentiated by 50 to 70% as evidenced by increased sleeping time.

The preparation of these compounds is further revealed by the following examples:

*Example I.—2-(2-γ-picolyl)-2-(β-diethylaminoethoxy)camphane*

A. PREPARATION OF 1-(2-γ-PICOLYL)-CARNEOL

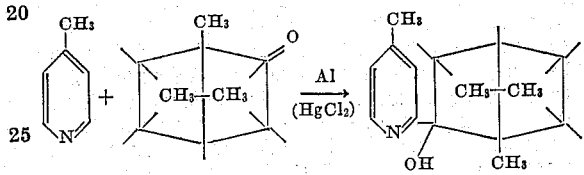

In a three-liter, three-neck flask equipped with a stirrer, reflux condenser and a dropping funnel were placed 90 g. of aluminum granules, 50 g. of γ-picoline, 0.5 g. of mercuric chloride and a few crystals of iodine. This mixture was heated to reflux and a mixture of 10 g. of camphor dissolved in 50 g. of γ-picoline was added. The resulting mixture was heated to reflux for 30 minutes until the reaction had been initiated. Then, 750 g. of camphor, dissolved in 831 g. of γ-picoline, was added dropwise during a period of about 2 hours. The mixture was heated to reflux with stirring for approximately 60 hours.

The mixture was diluted with 500 cc. of toluene and then washed (with cooling) with one liter of 15% sodium hydroxide solution. The layers were separated, the aqueous alkaline layer being discarded and the toluene layer being washed once with water. The toluene layer was then extracted with 10% hydrochloric acid until the extracts were uncolored. The toluene layer was discarded. The aqueous acidic extract was washed once with ether, then made alkaline (with cooling) to phenolphthalein by the addition of solid sodium hydroxide. The oil which separated was extracted with benzene. The benzene was removed by distillation under reduced pressure. The crude product was distilled at low pressure to yield 484 g. (39.5%, based on camphor) of pure 1-(2-γ-picolyl)-borneol, B. P. 125–130° C. (uncorr.) at 0.6 mm. The product crystallized upon standing.

B. PREPARATION OF THE BASIC ETHER

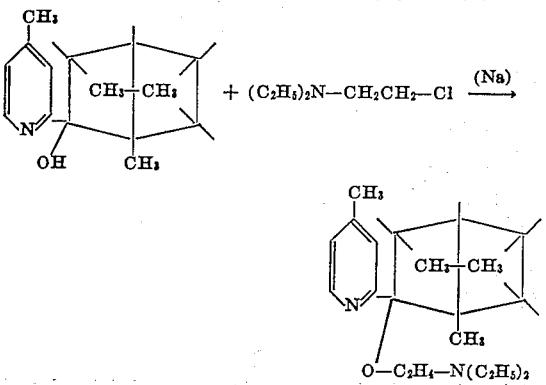

A toluene solution of β-diethylaminoethyl chloride was prepared from β-diethylaminoethyl chloride hydrochloride (665 g.) by dissolving the salt in 800 cc. of water, adding solid sodium hydroxide (185 g.) with cooling, and then extracting the amino chloride with several portions of toluene. The toluene extracts were combined and dried with anhydrous magnesium sulfate, then filtered.

Sodium metal (44.5 g.) was melted under 850 cc. of dry boiling toluene. With stirring, a solution of 1-(2-γ-picolyl)-borneol (474 g.) in 850 cc. of toluene was added to the finely divided suspension of molten sodium during a period of 2 hours. The resulting mixture was heated to reflux for about 16 hours, or until all of the sodium had reacted.

The dry toluene solution of β-diethylaminoethyl chloride was then added dropwise during a period of about 3 hours. The mixture was heated to reflux for about 16 hours. The solid which had separated was removed by filtration. The toluene was removed from the filtrate by distillation under reduced pressure, after which the residual oil was distilled at low pressure. The pure 2-(2-γ-picolyl)-2-(2-diethylaminoethoxy)-camphane amounted to 441 g. (66%), B. P. 142–147° C. (uncorr.) at 0.25 mm., $n_D^{25}$ 1.5090.

C. PREPARATION OF THE FUMARATE SALT

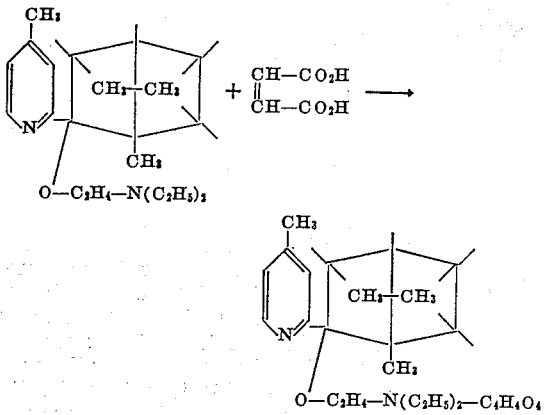

A mixture of 232 g. of 2-(2-γ-picolyl)-2-(2-diethylaminoethoxy)camphane and 75 g. of fumaric acid was dissolved in 450 cc. of boiling acetone. The solution was filtered hot and allowed to cool overnight at 5° C. The crystalline precipitate was filtered with suction, washed with cold acetone, then with ether. This material (225 g.) was recrystallized from acetone to give 183 g. (60%) of pure 2-(2-γ-picolyl)-2-(2-diethylaminoethoxy)camphane fumarate, M. P. 121–123° C. (corr.). Analysis of the product: Calcd. for $C_{26}H_{40}O_5N_2$: C, 67.79%; H, 8.75%; N, 6.08%. Found: C, 68.00%, 67.91%; H, 8.88, 8.84%; N, 5.87%, 5.90%.

*Example II.—2-(2-γ-picolyl)-2-(β-dimethylaminoethoxy) camphane*

This compound is obtained from the reaction of 1-(2-γ-picolyl)borneol and β-dimethylaminoethyl chloride using procedure IB above. The product is obtained as a pale yellow oil, B. P. 140–145° at about 0.25 mm.

*Example III.—2-(2-γ-picolyl)-2-(β-diethylaminoethoxy)-1,3,3-trimethylnorcamphane*

By reacting fenchone with α-picoline according to procedure IA above there is obtained 2-(2-γ-picolyl)-1,3,3 - trimethyl-2-norcamphanol as a yellow oil, B. P. 110–120° at 0.2 mm. The reaction of this material with β-diethylaminoethyl chloride according to procedure IB above gives the desired ether as a viscous oil, B. P. 145–150° at 0.2 mm.

*Example IV.—3-[2-(4,6-dimethylpyridyl)]-3-(β-dimethylaminoethoxy) menthane*

By reacting menthone with α,γ-lutidine according to procedure IA above there is obtained 3-[2-(4,5-dimethylpyridyl)]-3-menthanol as a yellow oil. This compound reacted with β-dimethylaminoethyl chloride by procedure IB above gives the basic ether, B. P. 150–160° at 0.3 mm.

*Example V. — 2-(2-pyridyl)-2-(β-dimethylaminoethoxy) camphane.* — α-(2-pyridyl)-bornyl alcohol was prepared by the procedure of Example I, using camphor as the ketone. The product was collected at 130–2° C./0.1 mm. The hydrochloride melted at 209–210° C. From this alcohol there was obtained by the etherification procedure of Example I the aminoether distilling at 134–138° C./0.2 mm. The melting point of the dihydrochloride was 146–148° C.

*Example VI.—2-(2-pyridyl)-2-(β-diethylaminoethoxy)-camphane*

From α-(2-pyridyl)bornyl alcohol and β-diethylaminoethyl chloride by the procedure of Example IB the amino ether, B. P. 150–54° C./0.3 mm. was obtained which was converted to 2-(2-pyridyl) - 2 - (β - diethylaminoethoxy)camphane fumarate, M. P. 144–46° C.

*Example VII. — 2-(2-pyridyl)-2-(β-dimethylaminoethoxy) - 1,3,3 - trimethylnorcamphane.*— α-(2-pyridyl)-fenchyl alcohol was obtained by the procedure of Example I using dl-fenchone as the ketone. The product was collected at 105–110° C./0.2 mm.; M. P. 54–56° C. The hydrochloride melted at 200–202° C. (dec.). This carbinol (58 grams) was converted to the β-dimethylaminoethyl ether; B. P. 135–138° C./0.2 mm. by the procedure of Example I. The hydrochloride melted at 197–198° C.

The β-diethylaminoethyl ether prepared in the same way from β-diethylaminoethyl chloride had a B. P. of 150–56°/0.2 mm. and gave a hydrochloride melting at 192–94°.

*Example VIII.—2-(2-pyridyl)-2-(β-dimethylaminoethoxy) cyclohexane.*—α-(2-pyridyl)-cyclohexanol was obtained by using cyclohexanone as the ketone in the procedure of Example I. It was collected at 140–145°/12 mm. Its hydrochloride melted at 157–59° C. corr. This carbinol was converted to the amino ether by the procedure of Example I to give the base of B. P. 139-42° C./1 mm. The dihydrochloride had a M. P. of 163-164°.

*Example IX.—1-(2-pyridyl)-1-(2-β-dimethylaminoethoxy)indane.*—1-(2-pyridyl) - 1 - indanyl alcohol, distilling at 140-144° C./0.3 mm. was prepared by the procedure of Example I, using α-hydrindone as the ketone. The hydrochloride melted at 154-156° C. This carbinol was converted by the etherification procedure of Example I to the aminoether, which distilled at 162-164° C./0.3 mm. The monohydrochloride melted at 137-139° C.

We claim:

1. The compounds of the generic formula:

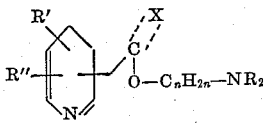

in which R' is selected from the group consisting of the hydrogen atom and alkyl radicals having from 1 to 2 carbon atoms, R'' is selected from the group consisting of the hydrogen atom and alkyl radical having from 1 to 2 carbon atoms, $n$ is an integer from 1 to 3, —$NR_2$ is selected from the group consisting of dimethylamino, diethylamino, methylethylamino, 4-morpholine, 1-piperidino and 1-pyrrolidino and

is a saturated hydrocarbon ring system containing from 6 to 10 carbon atoms, containing not more than two carbon ring systems and being attached to the pyridine nucleus at one of the positions 2 and 4.

2. 2-(2-γ-picolyl) - 2 -(β-diethylaminoethoxy)-camphane.

3. 2 -(2 - pyridyl) - 2 -(β-diethylaminoethoxy)-camphane.

4. 2-(2-pyridyl) -2 -(β-dimethylaminoethoxy)-1,3,3-trimethylnorcamphane.

5. 2 -(2-pyridyl) - 2 -(β-dimethylaminoethoxy) cyclohexane.

6. 2-(2-α-picolyl) - 2 -(β-diethylaminoethoxy)-1,3,3-trimethylnorcamphane.

ROBERT S. SHELTON.
CHARLES H. TILFORD.

No references.